3,551,492
N,N'-DIAMINOALKOXY-BENZYL-DIAMINO-
ALKANES AND THE SALTS THEREOF
Renat Herbert Mizzoni, Long Valley, N.J., assignor to
Ciba Corporation, New York, N.Y., a corporation of
Delaware
No Drawing. Continuation-in-part of application Ser. No.
358,625, Apr. 9, 1964. This application Oct. 31, 1967,
Ser. No. 679,512
Int. Cl. C07c 93/06
U.S. Cl. 260—570.7                    6 Claims

ABSTRACT OF THE DISCLOSURE

N,N'-aralkyl-alkylenediamines, e.g. such of the formula

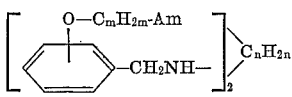

Am = sec. or tert. amino
m = 2–7
n = 6–20

N-oxides, quaternaries and salts thereof exhibit antiparasitic effects.

CROSS-REFERENCES TO RELATED APPLICATIONS

This is a continuation-in-part of application Ser. No. 358,625, filed Apr. 9, 1964 and now abandoned.

SUMMARY OF THE INVENTION

The present invention concerns and has for its object the provision of new N,N'-aralkyl-alkylenediamines, preferably those of Formula I

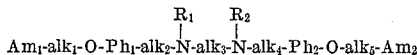

(I)

in which each of $Am_1$ and $Am_2$ is secondary or tertiary amino, each of $alk_1$, $alk_2$, $alk_4$ and $alk_5$ is lower alkylene separating two hetero-atoms by at least two carbon atoms, $alk_3$ is alkylene separating the nitrogen atoms by at least 6 carbon atoms, each of $Ph_1$ and $Ph_2$ is a phenylene radical and each of $R_1$ and $R_2$ is hydrogen or lower alkyl, N-oxides, quaternaries and salts thereof, as well as of corresponding pharmaceutical compositions, feedstuffs and feedstuff-additives and of methods for the preparation of these products. Said compositions and feedstuffs are useful antimicrobial and antiparasitic, e.g. antibacterial, antifungal, coccidiostatic and particularly taeniacidal agents.

DESCRIPTION OF THE PREFERRED EMBODIMENTS

The lower alkylene radicals $alk_1$ and $alk_5$, separating the adjacent heteroatoms by at least 2 carbon atoms, above all stand for 1,2-ethylene, but also for 1,2- or 1,3-propylene, 1,3-, 2,3- or 1,4-butylene, 1,4- or 1,5-pentylene, 1,5- or 1,6-hexylene or 1,7-heptylene. As used above and hereinafter in connection with organic radicals or compounds respectively, the term "lower" defines such with up to 7, preferably up to 4, carbon atoms.

The lower alkylene radicals $alk_2$ and $alk_4$ above all represent methylene, but also, for example, 1,1- or 1,2-ethylene, 1,1-, 1,2-, 2,2- or 1,3-propylene or 1,4-butylene.

The alkylene radical $alk_3$ more particularly contains 6–20, preferably 7–12 carbon atoms. Above all it is unbranched, such as 1,6-hexylene, 1,7-heptylene, 1,8-octylene, 1,9-nonylene, 1,10-decylene, 1,11-undecylene, 1,12-dodecylene, 1,13-tridecylene, 1,14-tetradecylene, 1,15-pentadecylene, 1,16-hexadecylene, 1,17-heptadecylene, 1,18-octadecylene, 1,19-nonadecylene or 1,20-eicosylene, but may also be branched, such as 1,6-heptylene, 1,7- or 2,7-octylene, 2,3-dimethyl-1,9-nonylene, 1,9- or 2,9-decylene, 1,10- or 2,10-undecylene, 2-methyl-1,11-undecylene, 1,10- or 2,11-dodecylene.

Each of $R_1$ and $R_2$ is preferably hydrogen, but also lower alkyl, such as methyl, ethyl, n- or i-propyl or -butyl.

The phenylene radicals $Ph_1$ and $Ph_2$ are preferably unsubstituted and represent, therefore, 1,2-, 1,3- or 1,4-phenylene, but may also be substituted by one or more than one additional substituent, which may be attached to any of the positions available for substitution. Such substituents are, for example, lower alkyl, e.g. methyl, ethyl, n- or i-propyl or -butyl, etherified hydroxy, such as lower alkoxy, e.g. methoxy, ethoxy, n- or i-propoxy or n-butoxy, or amino-lower alkoxy, e.g. a group $Am_1$-$alk_1$-O-, esterfied hydroxy, such as halogeno, e.g. fluoro, chloro or bromo, nitro or amino, preferably dilower alkylamino.

The amino groups $Am_1$ and $Am_2$ are above all tertiary amino, but also secondary amino, substituted, for example, by lower alkyl, e.g. methyl, ethyl, n- or i-propyl or -butyl, sec. butyl, pentyl or neopentyl, lower alkenyl, e.g. allyl or methylallyl, cycloalkyl or cycloalkyl-lower alkyl having from 3 to 7, preferably 5 or 6 ring-carbon atoms, e.g. cyclopentyl or cyclohexyl; cyclopentylmethyl or 2-cyclohexylethyl, carbocyclic aryl or aralkyl, e.g. phenyl - lower alkylamoin or N - phenyl - lower alkyl - N- aza-, -oxa- or -thia-alkylene. The above substituents, particularly lower alkyl or alkylene, may also carry functional groups, such as hydroxy, lower alkanoyloxy, e.g. acetoxy or propionyloxy, lower alkoxy, e.g. methoxy or ethoxy, lower alkylmercapto, e.g. methylmercapto or ethylmercapto. Specific amino groups $Am_1$ and $Am_2$ are, for example, mono- or di-lower alkylamino, e.g. methylamino, ethylamino, n- or i-propylamino or n-butylamino; dimethylamino, N-methyl-N-ethylamino, diethylamino, di-n- or i-propylamino or di-n-butylamino, cycloalkylamino or N-cycloalkyl-N-lower alkylamino with 3-7, preferably 5 or 6, ring-carbon atoms, e.g. cyclopentylamino or cyclohexylamino; N - cyclopentyl - N-methylamino, N-cyclohexyl - N - methylamino or N-cyclohexyl-N-ethylamino, phenyl-lower alkylamino or N-phenyl-lower alkyl-N-lower alkylamino, e.g. benzylamino, 2 - phenethylamino, N - benzyl - N - methylamino, N - benzyl - N - ethylamino, N - (1 - phenethyl) - N - ethyl or N - ( 2 - phenethyl) - N - methylamino, mono- or di-hydroxy-lower alkylamino or N-hydroxy-lower alkyl-N-lower alkylamino, in which the heteroatoms are separated by at least 2, preferably by 2 or 3, carbon atoms, e.g. mono- or di - (2 - hydroxyethyl)-amino or N-(2-hydroxyethyl)-N-methylamino; lower alkyleneimino, e.g. pyrrolidino, 2-methyl-pyrrolidino, piperidino, 2- or 4-methyl-piperidino, 3 - hydroxy-piperidino, 3-acetoxy-piperidino, 3-hydroxy-methyl-piperidino, 1,6-hexyleneimino or 1,7-heptyleneimino, mono-aza-lower alkyleneimino or N-lower alkyl-mono-aza-lower alkyleneimino, such as piperazino, 4-methyl- or 4-ethyl-piperazino, 4-hydroxyethyl- or 4-acetoxyethyl-piperazino, 3-aza-1,6-hexyleneimino, 3-methyl-3-aza-1,6-hexyleneimino, 4-aza-1,7-heptyleneimino or 4-methyl-4-aza-1,7-heptyleneimino, mono-oxa-lower alkyleneimino, such as 4-morpholino or 3-methyl-4-morpholino, or mono-thia-lower alkyleneimino, such as 4-thiamorpholino.

The quaternaries of the invention are preferably lower alkyl, hydroxy-lower alkyl or aralkyl, e.g. phenyl-lower alkyl quaternaries.

The compounds of the invention exhibit valuable pharmacological properties. Apart from antibacterial, antifungal and anticoccidial effects, for example, against *Diplococcus pneumoniae, Staphylococcus aureus, Escherichia coli, Pseudomonas aeruginosa* or *Mycobacterium tuberculosis; Trichophyton mentagrophytes, Candida*

*albicans, Cryptococcus neoformans* or *Histoplasma capsulatum;* or *Eimeria tenella,* they primarily show antiparasitic, particularly taeniacidal properties, for example, against *Hymenolepis nana, Dypilidium canium* or *Taenia pisiformis.* This can be demonstrated in in vitro and in vivo tests, using for the latter birds of mammals, e.g. chicken, mice or rats, as test objects.

Particularly useful are the compounds of Formula II

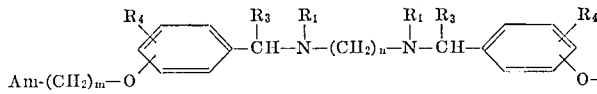

in which $n$ is an integer from 7 to 12, $m$ is the integer 2 or 3, $R_1$ is hydrogen or lower alkyl, $R_3$ is hydrogen or methyl, $R_4$ is hydrogen, lower alkyl, halogeno or the group $Am\text{-}(CH_2)_m\text{—}Q\text{—}$ and Am is di-lower alkyl amino, lower alkyleneimino, 4-lower alkyl-piperazino or 4-morpholino, and pharmaceutically acceptable acid addition salts thereof.

Especially valuable are those compounds of Formula II in which $n$ is an integer from 9 to 12, $m$ the integer 2, each of $R_1$, $R_3$ and $R_4$ is hydrogen and Am is dimethylamino, diethylamino or pyrrolidino, and pharmaceutically acceptable acid addition salts thereof which, when applied to chicken infected with *Eimeria tenella* at about 0.05–0.1% with the feed, show outstanding coccidostatic effects or when applied to mice infested with *Hymenolepis nana,* at oral doses of about 25 to 250 mg./kg./day, show outstanding taeniacidal activity.

The compounds of the invention are prepared according to methods known per se; for example, by reacting the diamine of the formula

successively with a reactive ester of the alcohols

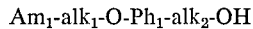

and HO-alk$_4$-O-alk$_5$-Am$_2$ or the aldehyde or ketone corresponding to said alcohols and hydrogenating any resulting Schiff's base and, if desired, converting a resulting salt into the free base or into another salt, and/or converting a resulting secondary amine into a tertiary amine and/or the latter into the N-oxide or a quaternary ammonium derivative thereof, and/or converting a resulting base into a salt thereof.

A reactive ester of said alcohols is preferably such of a strong inorganic acid, such as a mineral acid, particularly a hydrohalic acid, e.g. hydrochloric, hydrobromic or hydriodoic acid, as well as sulfuric acid, or a strong sulfonic acid, such as an aromatic or aliphatic sulfonic acid, e.g. p-toluene sulfonic, methane sulfonic or ethane sulfonic acid.

The reaction with said reactive ester is performed in such a way that either an excess of the amine is always present or another alkaline reagent, such as an alkali metal carbonate, e.g. sodium or potassium carbonate, or an organic base, e.g. pyridine, in order to neutralize the generated acid.

The reduction of resulting Schiff's bases may be performed, for example, with catalytically activated hydrogen, such as hydrogen in the presence of palladium, or a complex light metal hydride, e.g. lithium or sodium borohydride, lithium, sodium or magnesium aluminum hydride.

A resulting salt is converted into the free base, for example, by treating it with an alkaline reagent, such as a metal hydroxide, e.g. sodium, potassium or calcium hydroxide, or a metal carbonate, e.g. sodium or potassium carbonate or hydrogen carbonate, ammonia or a suitable hydroxyl ion exchange resin. It may also be converted into another salt, for example, by treating it with an anion exchange preparation, or a salt of an inorganic acid can be converted into another salt by reacting it with a suitable metal salt, e.g. sodium, barium or silver salt of an acid, preferably in the presence of a diluent, in which a resulting inorganic salt is insoluble and is thus removed from the reaction.

An N-oxide is prepared for example, by treating the free tertiary base with a suitable N-oxidizing reagent, such as hydrogen peroxide, ozone or a peracid, e.g. peracetic, perbenzoic, mono-perphthalic or persulfuric acid, in the presence of a suitable inert diluent. An N-oxide may 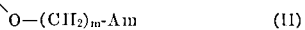 be converted into an acid addition salt thereof according to the procedure described below.

A tertiary amine or quaternary ammonium derivative is obtained, for example, by reacting the corresponding base with the reactive ester of the corresponding alcohol, for example, a lower alkyl halide, di-lower alkyl sulfate, lower alkyl sulfonate or phenyl-lower alkyl halide.

Resulting quaternary ammonium compounds may be converted itno other quaternary ammonium compounds, such as the quaternary ammonium hydroxides, for example, by reacting a quaternary ammonium halide with silver oxide, or a quaternary ammonium sulfate with barium hydroxide, or by treating a quaternary ammonium salt with a hydroxyl ion exchange preparation. A quaternary ammonium hydroxide is converted into a quaternary ammonium salt by reacting the former with a suitable acid. A quaternary ammonium salt is also converted directly into another quaternary ammonium salt; for example, a quaternary ammonium iodide, when reacted with freshly prepared silver chloride or with hydrochloric acid in anhydrous methanol, yields the desired quaternary ammonium chloride, or a quaternary ammonium salt when treated with a suitable anion exchange preparation, can be converted into another quaternary ammonium salt.

A free base is converted into an acid addition salt thereof, for example, by reacting it or a solution thereof in a suitable solvent or solvent mixture with an acid or a solution thereof, or with a suitable anion exchange preparation, and isolating the desired salt. It is preferably a pharmaceutically acceptable acid addition salt, for example, such of an inorganic acid, e.g. hydrochloric, hydrobromic, sulfuric or phosphoric acid, or an organic carboxylic or sulfonic acid, e.g. acetic, propionic, pivalic, glycolic, lactic, malonic, succinic, maleic, hydroxymaleic, malic, tartaric, citric, benzoic, salicyclic, 2-acetoxybenzoic, nicotinic or isonicotinic acid; methane sulfonic, ethane sulfonic, ethane 1,2-di-sulfonic, 2-hydroxyethane sulfonic, p-toluene sulfonic or naphthalene 2-sulfonic acid. Other addition salts may be useful as intermediates, for example, in the preparation of said pharmaceutically acceptable acid addition salts or in the purification of the free compounds, as well as for identification or characterization purposes. Salts, which are prepared primarily for the latter, are, for example, those of certain inorganic acids, e.g. perchloric, phosphotungstic, phosphomolybdic, chloroplatinic or Reinecke acid or of acidic organic nitro compounds, e.g. picric, picrolonic or flavianic acid. Mono- or poly-salts may be formed depending on the number of salt-forming groups and/or the conditions used for the salt formation.

The above reactions are carried out in the usual manner, i.e. in the presence or absence of diluents, preferably such as are inert to the reagents and are solvents thereof of catalysts, condensing agents and/or inert atmospheres, at low temperatures, room temperature or advantageously elevated temperatures, at atmospheric or superatmospheric pressure.

The starting material used is known or may be prepared according to methods used for the preparation of known analogs. Thus, reactive esters with hydrohalic acids are prepared, for example, by treatment of the alcohols with a thionyl halide, e.g. thionyl chloride, a phosphorus halide, e.g. phosphorus tribromide, pentachloride or oxychloride or an organic sulfonic acid halide, preferably in the presence of a basic reagent, e.g. pyridine or sodium carbonate. The alcohols, aldehydes or ketones themselves may be prepared from the corresponding phenols, e.g. those of the formulae

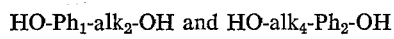

preferably their alkali metal salts, and reactive esters of the aminoalcohols

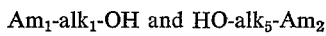

respectively. The diamine reagent may analogously be prepared from the corresponding reactive esters of the glycol HO-Alk$_3$-OH, for example a chloro-alkyl bromide, which first may be reacted under mild conditions with ammonia or the amine R$_1$—NH$_2$ and then under more vigorous conditions with R$_2$—NH$_2$, advantageously in the presence of a suitable base.

The invention also comprises any modification of the above process wherein an intermediate product obtainable at any stage of the process, is used as starting material and the remaining steps carried out or the process is discontinued at any stage thereof or in which the starting material is formed under the reaction condition or in which the reaction components are used in the form of their salts. That starting material is preferably used yielding the preferred embodiments of the invention mentioned above.

The compounds of this invention are useful in the form of pharmaceutical compositions suitable for enteral, e.g. oral, parenteral or topical use. Essentially, they comprise a pharmacologically effective amount of one of the compounds of this invention in admixture with a pharmaceutically acceptable, organic or inorganic, solid or liquid carrier, which usually represents the major portion of such compositions. These may be in solid form, for example, as capsules, tablets or dragees, in liquid form, for example, as solutions or suspensions, or in the form of emulsions, e.g. salves or creams. Suitable carrier materials are, for example, starches, e.g. corn, wheat or rice starch, sugars, e.g. lactose, glucose or sucrose, stearic acid or salts thereof, e.g. magnesium or calcium stearate, stearyl alcohol, talc, gums, acacia, tragacanth, polyalkylene glycols, propylene glycol and the like. The quantity and the nature of the carrier ingredients can vary widely and depend, inter alia, upon the desired physical appearance or size of the composition, method of manufacture and the like. Encapsulation may be effected by using, if desired, the same excipients as those for tablets. If necessary, the compositions may contain other auxiliary substances, such as preserving, stabilizing, wetting or emulsifying agents, salts for varying the osmotic pressure, buffers, etc. They may also contain, in combination, other pharmacologically useful substances. The compounding of the formulations, which contain about 0.1 to 75%, preferably 1 to 50%, of the active ingredient, is generally carried out in the manner normally employed in the art, i.e. by manufacturing a dry mixture or a granulate. The compounds of the invention may also be incorporated to about 0.001–0.2%, preferably to about 0.01–0.1%, into feedstuffs, preferably those for chicken or ruminants, or into feedstuff additives containing a suitable carrier, e.g. carbon, sugar and/or flour.

The following examples are intended to illustrate the invention and are not to be construed as being limitations thereon. Temperatures are given in degrees centigrade.

Example 1

A solution of 22.1 g. of 4-(2-N,N-diethylaminoethyl)-oxy-benzaldehyde and 7.9 g. of 1,9-diamino-nonane in 100 ml. of methanol is allowed to stand for two hours and is warmed on the steam bath for thirty minutes. The solution of the resulting N,N'-di-[4-(2-N,N-diethylaminoethyl)-oxy-benzal] - 1,9 - diamino-nonane is brought to room temperature and treated with 6.0 g. of sodium borohydride. After standing overnight, the solvent is removed under reduced pressure, and the residue is treated with water and sodium hydroxide. The organic material is extracted with diethyl ether; the organic extract is gassed with hydrogen chloride to yield the N,N'-di-[4-(2 - N,N - diethylaminoethyl)-oxy-benzyl] - 1,9 - diaminononane trihydrochloride of the formula

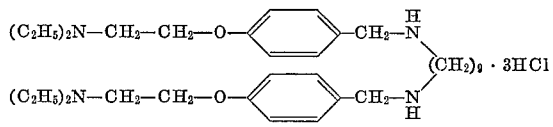

which melts as the monohydrate at 190–192.5°. After recrystallization from a mixture of ethanol (95 percent) and diethyl ether; yield: 27.2 g.

Example 2

A mixture of 3.85 g. of 4-(2-N,N-diethylaminoethyl)-oxy-benzaldehyde and 1.5 g. of 1,10-diamino-decane in 25 ml. of methanol is allowed to stand overnight at room temperature. The resulting solution of the N,N'-di-[4-(2-N,N - diethylaminoethyl)-oxy-benzal] - 1,10 - diamino-decane is treated with 1.0 g. of sodium borohydride, and the reaction mixture is again allowed to stand overnight at room temperature. The solvent is removed under reduced pressure, and the residue is treated with 50 ml. of water and 10 ml. of an aqueous solution of sodium hydroxide. The organic material is extracted with methylene chloride; the organic extracts are combined, washed with water, and gassed with dry hydrogen chloride. The resulting solid N,N'-di-[4-(2 - N,N - diethylaminoethyl)-oxy-benzyl] - 1,10 - diamino-decane tetrahydrochloride of the formula

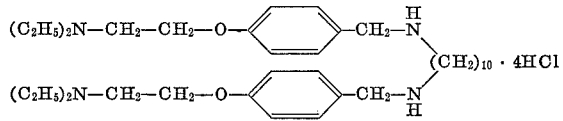

is filtered off and recrystallized from a mixture of isopropanol and diethyl ether. It melts at 201–202° as the monohydrate; yield: 4.9 g.

Example 3

A mixture of 10.3 g. of 4-(2-N,N-diethylaminoethyl)-oxy-benzaldehyde and 4.4 g. of 1,11-diamino-undecane in 100 ml. of methanol is allowed to stand at room temperature for one hour and is then heated on the steam bath for one hour. After cooling, the solution containing the N,N'-di-[4-(2 - N,N - diethylaminoethyl)-oxy-benzal] 1,11-diamino-undecane is treated with 3.0 g. of sodium borohydride (added in portions), and is again allowed to stand for two hours at room temperature. The solvent is removed under reduced pressure, and the residue is treated with water and an aqueous sodium hydroxide solution. The organic material is extracted with three portions of methylene chloride; the organic extracts are combined, concentrated to about one-fourth of the original volume and diluted with four times the amount of diethyl ether. Dry gaseous hydrogen chloride is passed through the solution and the solid N,N'-di-[4-(2-N,N-diethylaminoethyl)-oxy-benzyl] - 1,11 - diamino-undecane tetrahydrochloride of the formula

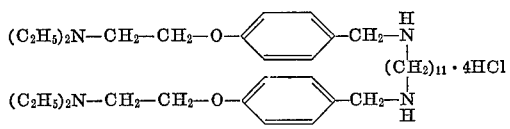

is filtered off. It is recrystallized from a mixture of isopropanol and diethyl ether and melts as the hemihydrate at 159–160°; yield: 12.8 g.

Example 4

The solutions of 5.0 g. of 4-[2-(1-pyrrolidino)-ethyl]-oxy-benzaldehyde and 1.6 g. of 1,9-diamino-nonane in a total of 25 ml. of methanol are mixed and allowed to stand at room temperature. The resulting solution of the N,N'-di-{4-[2-(1-pyrrolidino)-ethyl] - oxy - benzal}-1,9-diamino-nonane is treated with 1.5 g. of sodium borohydride, in portions, and the reaction mixture is allowed to stand at room temperature for three hours. The solvent is then removed under reduced pressure, and the residue is treated with water; the solution is made basic with a 15 percent aqueous solution of sodium hydroxide. The resulting oil is extracted with methylene chloride; the organic extracts are combined, dried over magnesium sulfate, and evaporated. The residue is dissolved in ethyl acetate and treated with a saturated solution of hydrogen chloride in ethyl acetate. The resulting white solid N,N'-di-{4-[2-(1-pyrrolidino)-ethyl] - oxy-benzyl}-1,9-diamino-nonane tetrahydrochloride of the formula

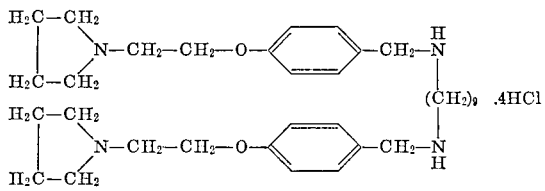

is collected and recrystallized from anhydrous ethanol, M.P. 237–240°; yield: 5.0 g.

The starting material used in the above procedure is prepared as follows: To a solution of 61.0 g. of 4-hydroxy-benzaldehyde in 110 ml. of N,N-dimethylformamide and 110 ml. of toluene is added 23.2 g. of a 53.5 percent suspension of sodium hydride in mineral oil. The mixture is diluted with an additional 300 ml. of toluene, and then treated with 69.0 g. of 1-(2-chloroethyl)-pyrrolidine in 200 ml. of toluene. Stirring is continued overnight, and the reaction mixture is filtered; the solid material is washed with toluene, and the combined filtrate and washings are concentrated under reduced pressure. The residue is treated with water and extracted with diethyl ether; the organic solution is washed with 2 N hydrochloric acid and the aqueous washings are made basic with an aqueous solution of sodium hydroxide. The basic organic material is extracted with diethyl ether, the solvent is dried and evaporated, and the residue is purified by distillation. The desired 4-[2-(1-pyrrolidino)-ethyl]-oxy-benzaldehyde is collected at 162–164°/4 mm.

Example 5

Solutions of 22.1 g. of 4-(2-N,N-diethylaminoethyl)-oxy-benzaldehyde and 7.2 g. of 1,8-diamino-octane in a total of 100 ml. of methanol are mixed and allowed to stand overnight at room temperature. After washing for thirty minutes on the steam bath, the solution containing the N,N' - di[4-(2-N,N-di-ethylamino-ethyl)-oxy-benzal]-1,8-diamino-octane is cooled and treated at room temperature with 6.0 g. of sodium borohydride, added in portions. After standing for several hours, the solvent is removed under reduced pressure; the residue is diluted with water and treated with 25 ml. of a 50 percent aqueous solution of sodium hydroxide. The organic material is extracted with diethyl ether and the extract is dried over anhydrous magnesium sulfate and treated with dry gaseous hydrogen chloride. The white solid N,N'-di[4-(2-N,N-diethylaminoethyl)-oxy-benzyl] - 1,8 - diamino - octane tetrahydrochloride of the formula

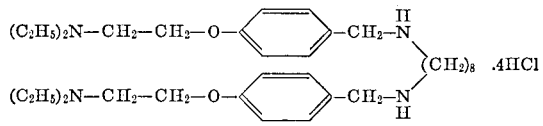

is filtered off and is recrystallized from a mixture of isopropanol and methano, M.P. 227–230°; yield: 21.5 g.

Example 6

Other compounds of this invention, prepared according to the above-described and illustrated procedure by selecting the appropriate starting materials are, for example,

| Starting material | Reagent | Product |
| --- | --- | --- |
| N,N'-di{2-[4-(2-N,N-diethylaminoethyl)-oxyphenyl]-ethylidene}-1,9-diamino-nonane. | Sodium borohydride | N,N'-di-{2-[4-(2-N,N-diethylaminoethyl)-oxyphenyl]-ethyl}-1,9-diamino-nonane. |
| N,N'-di-{4-[2-(3-N,N-dimethylaminopropyl)-oxybenzal]-1,9-diaminononane. | do | N,N'-di-{4-[2-(3-N,N-dimethylaminopropyl)-oxybenzyl]-1,9-diaminononane. |
| N,N'-di-{4-[2-(1-piperidino)-ethyl]-oxybenzal}-1,10-diaminodecane. | do | N,N'-di-{4-[2-(1-piperidino)-ethyl]-oxy-benzyl}-1,10-diamino-decane. |
| N,N'-di-{4-[2-(4-morpholino)-ethyl]-oxybenzal}-1,11-diamino-undecane. | do | N,N'-di-{4-[2-(4-morpholino)-ethyl]-oxy-benzyl}-1,11-diamino-undecane. |
| N,N'-di-{4-[2-(1-pyrrolidino)-ethyl]-oxy-benzal}-1,11-diamino-undecane. | do | N,N'-di-{4-[2-(1-pyrrolidino)-ethyl]-oxy-benzyl}-1,11-diamino-undecane. |
| N,N'-di-[4-(2-N,N-diethylaminoethyl)-oxy-benzal]-1,12-diamino-dodecane. | do | N,N'-di-[4-(2-N,N-diethylaminoethyl)-oxy-benzyl]-1,12-diamino-dodecane. |
| N,N'-di-[4-(2-N,N-diethylaminoethyl)-oxybenzal]-1,6-diamino-hexane. | do | N,N'-di-[4-(2-N,N-diethylaminoethyl)-oxy-benzyl]-1,6-diamino-hexane. |
| N,N'-di-[4-(2-N,N-diethylaminoethyl)-oxybenzal]-1,7-diamino-heptane. | do | N,N'-di-[4-(2-N,N-diethylaminoethyl)-oxy-benzyl]-1,7-diamino-heptane. |
| N,N'-di-[4-(2-N,N-diethylaminoethyl)-oxy-benzal]-1,9-diamino-1,9-dimethyl-nonane. | do | N,N'-di-[4-(2-N,N-diethylaminoethyl)-oxy-benzyl]-1,9-diamino-1,9-dimethyl-nonane. |
| N,N'-di-[4-(2-N-ethylaminoethyl)-oxy-benzal]-1,9-diamino-nonane. | do | N,N'-di-[4-(2-N-ethylaminoethyl)-oxo-benzyl]-1,9-diamino-nonane. |
| N,N'-di-{4-[2-(4-methyl-1-piperazino)-ethyl]-oxy-benzal}-1,9-diamino-nonane. | do | N,N'-di-{4-[2-(4-methyl-1-piperazino)-ethyl]-oxy-benzyl}-1,9-diamino-nonane. |
| N,N'-di-[3,4-di-(2-N,N-diethylaminoethyl)-oxy-benzal]-1,9-diamino-nonane. | do | N,N'-di-[3,4-di-(2-N,N-diethylaminoethyl)-oxy-benzyl]-1,9-diamino-nonane. |
| N,N'-di-[2,3,4-tri-(2-N,N-diethylaminoethyl)-oxy-benzal]-1,11-diamino-undecane. | do | N,N'-di-[2,3,4-tri-(2-N,N-diethylaminoethyl)-oxy-benzyl]-1,11-diamino-undecane. |
| N,N'-di-[4-(2-N,N-diethylaminoethyl)-oxy-benzal]-1,14-diamino-tetradecane. | do | N,N'-di-[4-(2-N,N-diethylaminoethyl)-oxy-benzyl]-1,14-diamino-tetradecane. |
| N,N'-di-[4-(2-N,N-diethylaminoethyl)-oxy-benzal]-1,20-diamino-eicosane. | do | N,N'-di-[4-(2-N,N-diethylaminoethyl)-oxy-benzyl]-1,20-diamino-eicosane. |
| N,N'-di-[3-chloro-4-(2-N,N-diethylaminoethyl)-oxy-benzal]-1,9-diamino-nonane. | do | N,N'-di-[3-chloro-4-(2-N,N-diethylaminoethyl)-oxy-benzyl]-1,9-diamino-nonane. |
| N,N'-di-[4-(N,N-diethylaminoethyl)-oxy-3-methyl-benzal]-1,10-diamino-decane. | do | N,N'-di-[4-(N,N-diethylaminoethyl)-oxy-3-methyl-benzyl]-1,10-diamino-decane. |
| N,N'-di-[4-(N,N-diethylaminoethyl)-oxy-benzoyl]-N,N'-dimethyl-1,9-diamino-nonane. | Lithium aluminum hydride | N,N'-di-[4-(N,N-diethylaminoethyl)-oxy-benzyl]-N,N'-dimethyl-1,9-diamino-nonane. |

Example 7

According to the method shown in the previous examples, the compounds of the formula

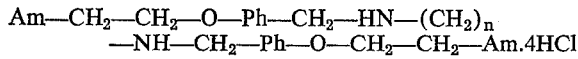

Am—CH$_2$—CH$_2$—O—Ph—CH$_2$—HN—(CH$_2$)$_n$
—NH—CH$_2$—Ph—O—CH$_2$—CH$_2$—Am.4HCl are prepared from equivalent amounts of the corresponding starting material:

| n | Ph | Am | M.P., ° |
|---|---|---|---|
| 6 | 1,4-phenylene | Diethylamino | [1] 245 |
| 7 | do | do | 196–200 |
| 12 | do | do | 158–160 |
| 9 | do | Dimethylamino | 243–245 |
| 11 | do | do | 219–222 |
| 7 | 1,3-phenylene | Diethylamino | 115–118 |
| 9 | do | do | 131–133 |
| 11 | do | do | 135–137 |
| 7 | 1,2-phenylene | do | [1] 230–233 |
| 9 | do | do | 187–191 |
| 11 | do | do | [1] 137 |

[1] Decanoate.

Example 8

Preparation of 10,000 tablets each containing 100.0 mg. of the active ingredient.

Formula: G.
N,N' - di - [4 - (2 - dimethylamino-ethoxy) benzyl]-1,11-diamino-undecane tetrahydrochloride _____ 1,000.00
Lactose _____ 2,535.00
Corn starch _____ 125.00
Polyethylene glycol 6,000 _____ 150.00
Talcum powder _____ 150.00
Magnesium stearate _____ 40.00
Purified water, q.s.

Procedure.—All the powders are passed through a screen with an opening of 0.6 mm. Then the drug substance, lactose, talcum, magnesium stearate and half of the starch are mixed in a suitable mixer. The other half of the starch is suspended in 65 ml. water and the suspension added to the boiling solution of the polyethylene glycol in 260 ml. water. The paste formed is added to the powders which are granulated, if necessary, with an additional amount of water. The granulate is dried overnight at 35°, broken on a screen with 1.2 mm. openings and compressed into tablets using concave punches with 10.3 mm. diameter, uppers bisected.

Example 9

Preparation of an additive for chicken feed containing 50% of the active ingredient.

Formula: G.
N,N' - di - [2 - (2 - diethylamino-ethoxy)- benzyl] - 1,11 - diamino-undecane tetrahydrochloride _____ 5,000.0
Confectioners sugar _____ 1,500.0
Soybean feed, solvent extracted _____ 3,500.0

Procedure.—The hydrochloride and sugar are triturated in a comminuting machine and passed through a screen with an opening of 0.6 mm. The screened material is then blended with the soybean feed in a horizontal mixer. The additive obtained is mixed with a customary chicken feed, in order to obtain a concentration of 0.05% of the drug substance in the feed. It can be applied to chicken infected with *Eimeria tenella*.

I claim:
1. A compound having the formula

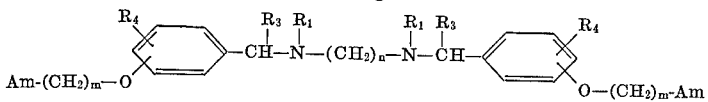

in which $n$ is an integer from 7 to 12, $m$ is the integer 2 or 3, $R_1$ is hydrogen or lower alkyl, $R_3$ is hydrogen or methyl, $R_4$ is hydrogen, lower alkyl, halogeno or the group Am—(CH$_2$)$_m$—O— and Am is dilower alkylamino, and pharmaceutically acceptable acid addition salts thereof.

2. A compound as claimed in claim 1 in which formula $n$ is an integer from 9 to 12, $m$ the integer 2, each of $R_1$, $R_3$ and $R_4$ is hydrogen and Am is dimethylamino or diethylamino, and pharmaceutically acceptable acid addition salts thereof.

3. A compound as claimed in claim 2 and being the N,N' - di - [4 - (2 - dimethylamino-ethoxy) benzyl]-1,11-diamino-undecane and its tetrahydrochloride.

4. A compound as claimed in claim 2 and being the N,N' - di - [4 - (2 - diethylamino-ethoxy)-benzyl]-1,11-diamino-undecane and its tetrahydrochloride.

5. A compound as claimed in claim 2 and being the N,N' - di - [3 - (2 - diethylamino-ethoxy)-benzyl]-1,11-diamino-undecane and its tetrahydrochloride.

6. A compound as claimed in claim 2 and being the N,N' - di - [2 - (2 - diethylamino-ethoxy)-benzyl]-1,11-diamino-undecane and its tetrahydrochloride.

References Cited

UNITED STATES PATENTS

| 2,687,416 | 8/1954 | Persch et al. | 260—570.7X |
| 2,709,700 | 5/1955 | Szabo et al. | 260—570.5X |
| 3,013,020 | 12/1961 | Fancher | 260—570.5X |
| 3,320,271 | 5/1967 | Lednicer | 260—570.7X |

ROBERT V. HINES, Primary Examiner

U.S. Cl. X.R.

99—2; 260—239, 243, 247.2, 247.7, 268, 294.3, 294.7, 295.5, 311, 326.3, 326.5, 429, 438.5, 456, 458, 459, 463, 471, 490, 501.18, 501.19, 566, 567.5, 567.6, 570.8, 570.9; 424—244, 246, 248, 250, 266, 267, 274, 330